United States Patent [19]

Matsuda et al.

[11] Patent Number: 5,453,667
[45] Date of Patent: Sep. 26, 1995

[54] INVERTER HAVING FREQUENCY CHANGING FUNCTION

[75] Inventors: Mitsuhiro Matsuda; Keiichi Shimizu, both of Yokohama; Kenji Araki, Chita; Ichiro Yokozeki; Fumio Hirano, both of Yokosuka, all of Japan

[73] Assignee: Toshiba Lighting & Technology Corporation, Tokyo, Japan

[21] Appl. No.: 83,510

[22] Filed: Jun. 30, 1993

[30] Foreign Application Priority Data

Jun. 30, 1992 [JP] Japan .................................. 4-172100
Sep. 29, 1992 [JP] Japan .................................. 4-259813

[51] Int. Cl.$^6$ .................................................. H05B 41/16
[52] U.S. Cl. .......................... 315/248; 315/307; 315/311; 315/DIG. 2
[58] Field of Search ................................... 315/248, 247, 315/246, 311, 307, DIG. 2, 291

[56] References Cited

U.S. PATENT DOCUMENTS 5,063,332  11/1991  El-Hamamsy .......................... 315/311

Primary Examiner—Benny Lee
Assistant Examiner—Reginald A. Ratliff
Attorney, Agent, or Firm—Oblon, Spivak, McClelland, Maier, & Neustadt

[57] ABSTRACT

This invention suppresses the occurrence of interference in a very short period to prevent device destruction. An inverter circuit of this invention includes a crystal oscillator, which oscillates at a fixed frequency, a load-status detector, which receives a voltage and current to be applied to a load including an inductive or capacitive component and detects the status of the load, a voltage-controlled oscillator, which oscillates at a frequency corresponding to the load status detected by the load-status detector, and a switch, which selects the output of the crystal oscillator or the output of the voltage-controlled oscillator and supplies the selected output to the load. An electrodeless discharge lamp lighting device according to this invention uses an inverter circuit having the above structure.

20 Claims, 7 Drawing Sheets

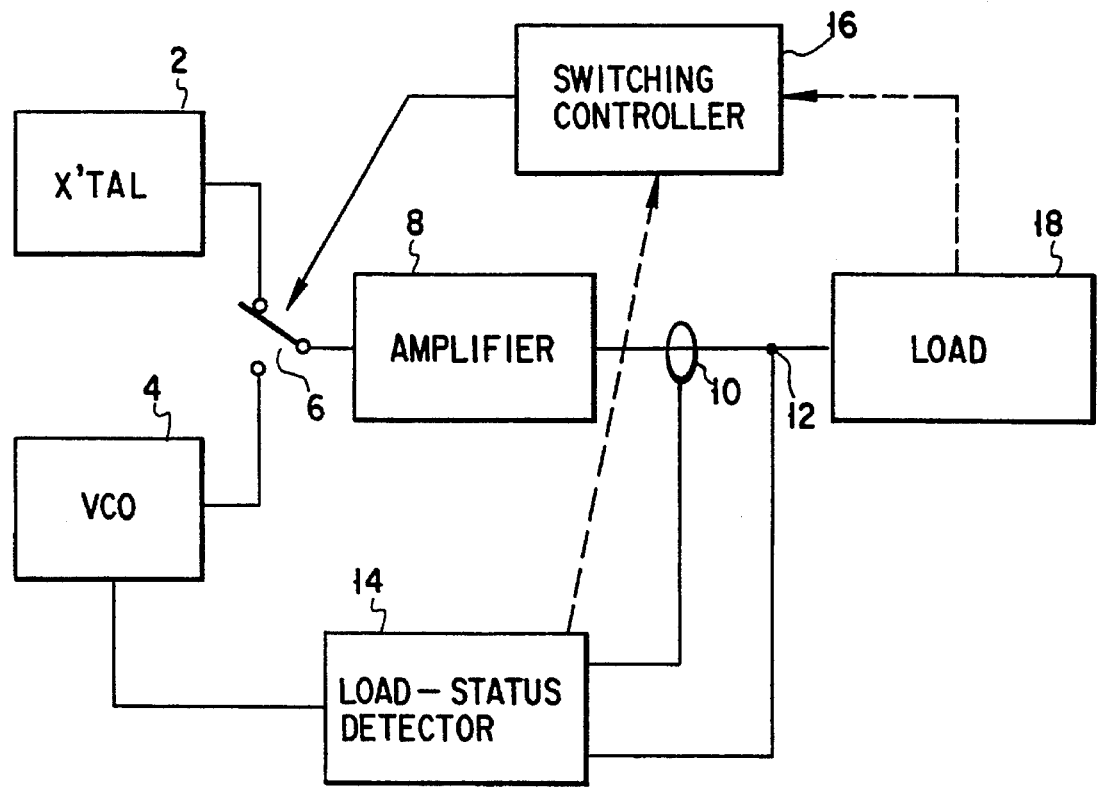
F I G. 1
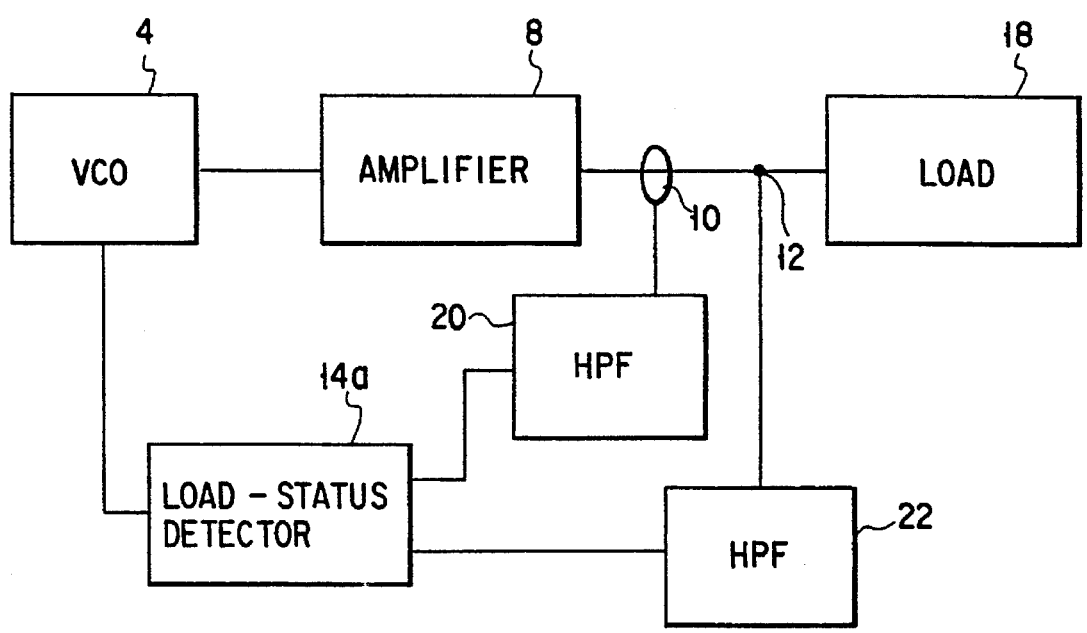
F I G. 2

5,453,667

INVERTER HAVING FREQUENCY CHANGING FUNCTION

BACKGROUND OF THE INVENTION

1. Field of the Invention

The present invention relates to an inverter circuit adaptable for a discharge lamp load, electronic motor load, high-frequency industrial heating load, antenna load and so forth, and an electrodeless discharge lamp lighting apparatus using this inverter circuit.

2. Description of the Related Art

A conventional inverter circuit is designed to perform switching the output of a fixed frequency oscillator. A conventional electrodeless discharge lamp lighting apparatus uses such an inverter circuit which performs switching the output of a fixed frequency oscillator.

Since the inverter circuit performs switching the output of the fixed frequency oscillator, the frequency associated with the output becomes stable and falls within the desired frequency range. This inverter circuit thus has an excellent feature that no interference will occur in the frequency band that is used in communications.

But this inverter circuit is shifted off the impedance matching status due to a variation in the frequency response of a load containing an inductive or capacitive component (hereinafter referred simply as "load"), which occurs, for example, at the time of lamp starting or with the passage of time. Consequently, the phase relation between the voltage and current output from the inverter circuit changes. This lowers the inverter efficiency and would destroy the device at worst.

An inverter circuit using a variable frequency oscillator may be used instead. However, the frequency of the output of this inverter circuit varies in accordance with a change in the frequency response of the load, so that there is a probability of relatively frequent occurrence of interference in the communications band.

In an electrodeless discharge lamp lighting apparatus, a matching circuit is provided between the inverter circuit and a load constituted of an exciting coil or activation high voltage generating section to make the declination of the load impedance approach zero. This lighting apparatus is however shifted off the matching state due to an adjustment error at the time the apparatus is assembled, a time-dependent change in characteristic, or the like. This causes an excessive amount of reactive current to flow through the device, damaging the device.

SUMMARY OF THE INVENTION

It is therefore an object of the present invention to provide an inverter circuit and an electrodeless discharge lamp lighting apparatus, which can suppress the occurrence of interference to a negligible level and can properly cope with a variation in frequency of a load, thereby preventing the device from being broken.

According to one aspect of the present invention, there is provided a lamp operating apparatus for an electrodeless discharge lamp having at least two kinds of status during operation, comprising:

means for supplying at least two kinds of high frequency electromagnetic power to the electrodeless discharge lamp which are different from one another in frequency; and means for changing frequency of the high frequency electromagnetic power supplied to the electrodeless discharge lamp corresponding to the at least two kinds of status of the electrodeless discharge lamp.

To achieve this object, according to another aspect of the present invention, there is provided an inverter circuit comprising:

first oscillation means which oscillates at a fixed frequency;

load-status detecting means for receiving a voltage and current applied to a load including an inductive or capacitive component to detect a status of the load;

second oscillation means which oscillates at a frequency corresponding to the load status detected by the load-status detecting means; and means for selecting one of an output of the first oscillation means and an output of the second oscillation means to change a frequency in accordance with the load status.

According to still another aspect of the present invention, there is provided an electrodeless discharge lamp lighting apparatus comprising:

an electrodeless discharge lamp;

load-status detecting means for detecting a load status of the electrodeless discharge lamp;

first oscillation means which oscillates at a fixed frequency;

second oscillation means which oscillates at a frequency corresponding to the load status of the electrodeless discharge lamp detected by the load-status detecting means;

means for selecting one of an output of the first oscillation means and an output of the second oscillation means to change a frequency in accordance with the load status of the electrodeless discharge lamp; and control means for controlling a frequency change caused by the frequency changing means in accordance with the load status of the electrodeless discharge lamp.

According to a further aspect of the present invention, there is provided an electrodeless discharge lamp lighting apparatus for supplying a high-frequency current to an exciting coil located close to an electrodeless discharge lamp to operate the electrodeless discharge lamp, the apparatus comprising:

an oscillation circuit including the exciting coil;

a phase difference detector for detecting a phase difference between the high-frequency current related to the exciting coil of the oscillation circuit and a reference signal; and a controller for controlling a resonance frequency of the oscillation circuit to a constant level so that the phase difference detected by the phase difference detector becomes zero.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram illustrating the structure of an inverter circuit according to one embodiment of the present invention;

FIG. 2 is a block diagram illustrating the structure of an inverter circuit according to another embodiment of the present invention;

DETAILED DESCRIPTION OF THE PREFERRED EMBODIMENTS

Figure 3:
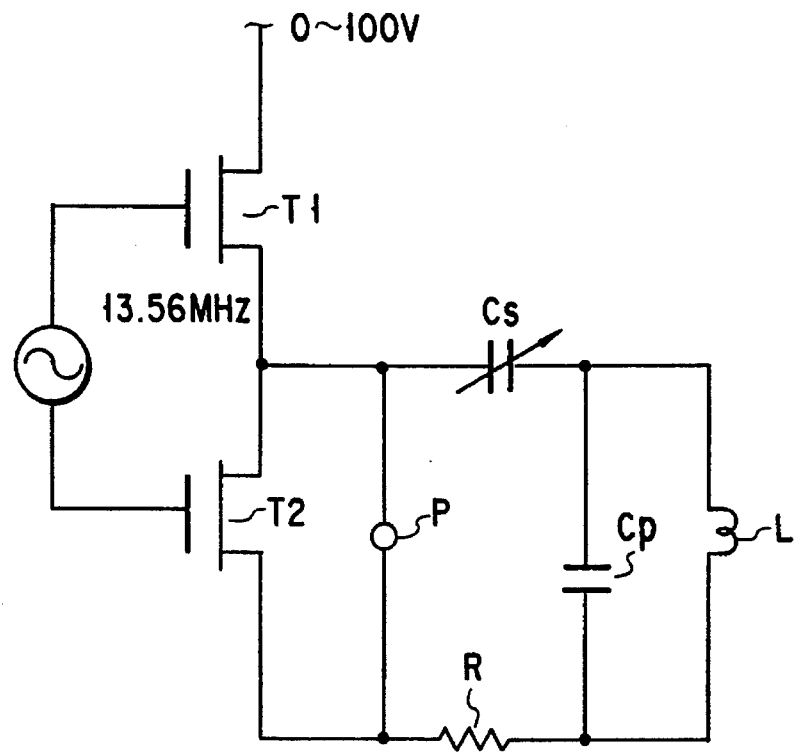
FIG. 3 is a diagram showing a circuit for testing the device destruction of an electrodeless discharge lamp lighting apparatus.

Preferred embodiments of the present invention will now be described referring to the accompanying drawings.

FIG. 1 presents a block diagram illustrating the structure of an inverter circuit according to one embodiment of the present invention. In this diagram, this inverter circuit comprises a crystal oscillator 2, which oscillates at a fixed frequency (e.g., 13.56 MHz), a voltage-controlled oscillator (VCO) 4, which oscillates at a frequency corresponding to a control voltage, a switch 6 for selecting the output of the crystal oscillator 2 or the output of the voltage-controlled oscillator 4, an amplifier 8, a current pickup section 10, a voltage pickup section 12, a load-status detector 14 for detecting the status of a load 18, and a switching controller 16 for controlling the switch 6.

One of the outputs of the crystal oscillator 2 and the voltage-controlled oscillator 4 is selected by the switch 6 and is then supplied to the amplifier 8. This amplifier 8 includes switching elements, which performs switching the oscillator output. The output of the amplifier 8 is supplied to the load 18.

The current pickup section 10 and voltage pickup section 12 are provided on a line extending from the amplifier 8 to the load 18 to respectively detect signals corresponding to the current and voltage output from the amplifier 8. The voltage and current detected by those pickup sections are given to the load-status detector 14 to be used for detection of the load status. While there are various ways of detecting the load status, the phase difference between the voltage and current is detected in this example.

When the frequency response of the load 18 changes, the inverter circuit is shifted off the matching state and the phases of the voltage and current associated with the inverter output varies. In this respect, the load-status detector 14 is designed to detect which phase, the phase of the voltage or that of the current, and how much is leading (or lagging), and output a control voltage having a potential corresponding to the detection result. More specifically, the load-status detector 14 outputs the control voltage having such a level as to set the frequency of the load 18 to the same frequency as that of the crystal oscillator 2, when the phase difference is zero, and alters the control voltage so as to reduce the oscillation frequency as the phase of the current lags behind that of the voltage. As the phase of the current leads ahead that of the voltage, on the other hand, the load-status detector 14 alters the control voltage so as to increase the oscillation frequency.

The switching controller 16 controls the switch 6, and obtains information about the operational status of the load 18 from the load 18 or the load-status detector 14. When detecting via the load-status detector 14 that the impedance of the load 18 greatly changes at the start of the operation or at the end of the service life of the load 18, the switching controller 16 sets the switch 6 to the voltage-controlled oscillator (4) side when such detection is made. When the impedance of the load 18 is stable, the switching controller 16 sets the switch 6 to the crystal oscillator (2) side.

Through the above operation, the output of the amplifier 8 is supplied to the load 18, with the voltage and current basically in phase, thus preventing the inverter circuit from being broken. When the impedance of the load 18 is stabled, the switching takes place the output of the crystal oscillator 2 to suppress the interference, which is an advantage of the oscillation at a fixed frequency. When the impedance of the load 18 greatly varies, the oscillation frequency is changed by the voltage-controlled oscillator 4 to suppress the difference between the phases of the voltage and current. This action takes place in a very short period of time, such as at the beginning of the activation where the impedance of the load 18 changes greatly, so that there is hardly any influence of the interference over the communications.

In the above-described embodiment, the switching of the inverter circuit is executed based on a change in the impedance of the load 18.

As a change in impedance appears as the phase difference between the voltage and current, the switching takes place when the phase difference exceeds an allowable value. A description will now be given of an embodiment which detects the operation of the load 18 optically, magnetically, thermally, electrically or likewise, and performs the switching at the desired timing. In a further embodiment, the switch 6 is manually changed over, not by the switching controller 16.

FIG. 2 presents a block diagram illustrating another structure of the inverter circuit. FIG. 2 uses like or same reference numerals as used in FIG. 1 to specify corresponding or identical components.

In this embodiment, the crystal oscillator 2, switch 6 and switching controller 16 are eliminated from the inverter circuit of FIG. 1, and the load-status detector 14 is replaced with a load-status detector 14a with high-pass filters (HPF)

20 and 22 provided between this detector 14a and the current pickup section 10 and voltage pickup section 12, respectively. With regard to the current and voltage, which are to be applied to the load 18, the signals detected by the current pickup section and voltage pickup section 12 are allowed to travel to the load-status detector 14a only when there are transient changes in those signals.

When no signals are coming through the high-pass filters 20 and 22 (this case corresponding to the oscillation frequency of the crystal oscillator 2 in FIG. 1), the load-status detector 14a outputs a control voltage to cause oscillation at a predetermined frequency. When receiving signals from the high-pass filters 20 and 22, the load-status detector 14a operates in the same manner as the load-status detector 14 of FIG. 1 to output a control voltage based on the phase relationship between the voltage and current.

With this structure, when a large transient change occurs in the impedance of the load 18, the voltage-controlled oscillator 4 changes the oscillation frequency to suppress the phase difference between the voltage and current. When the impedance of the load 18 is stable, on the other hand, the switching of the inverter circuit is conducted a fixed frequency (though not shown) similar to the output of a crystal oscillator. In other words, this embodiment has the same advantage as the above-described first embodiment.

A description will now be given of an electrodeless discharge lamp lighting apparatus to which the above-described inverter circuit is adapted.

An electrodeless discharge lamp lighting apparatus needs large high-frequency power (e.g., 100 to several hundred watts) at the starting, and the element which becomes a load to the high-frequency power source at that time mainly consists of the reactive components, an exciting coil and a high-voltage generator for starting. The high-voltage generator includes an LC resonant circuit or a high-frequency transformer. Therefore, a large amount of reactive current flows through the device, damaging the device.

In this respect, the above-described inverter circuit will be used. It is important to find what characteristic a load element to the high-frequency power source in an electrodeless discharge lamp lighting apparatus actually has.

In an electrodeless discharge lamp lighting apparatus, therefore, a load portion and an inverter circuit portion were achieved by a half bridge type circuit as shown in FIG. 3, and a capacitor Cs and a source voltage $V_{DD}$ were adjusted to check the relation between the limit output power at which FETs T1 and T2 would be broken and the phase difference between the voltage and current. In the diagram, "L" is an exciting coil (170 nH), "Cp" is a matching capacitor (530 pF), "R" is non-inductive resistor for measuring the output current, and "P" is an output voltage measuring point.

Figure 4:
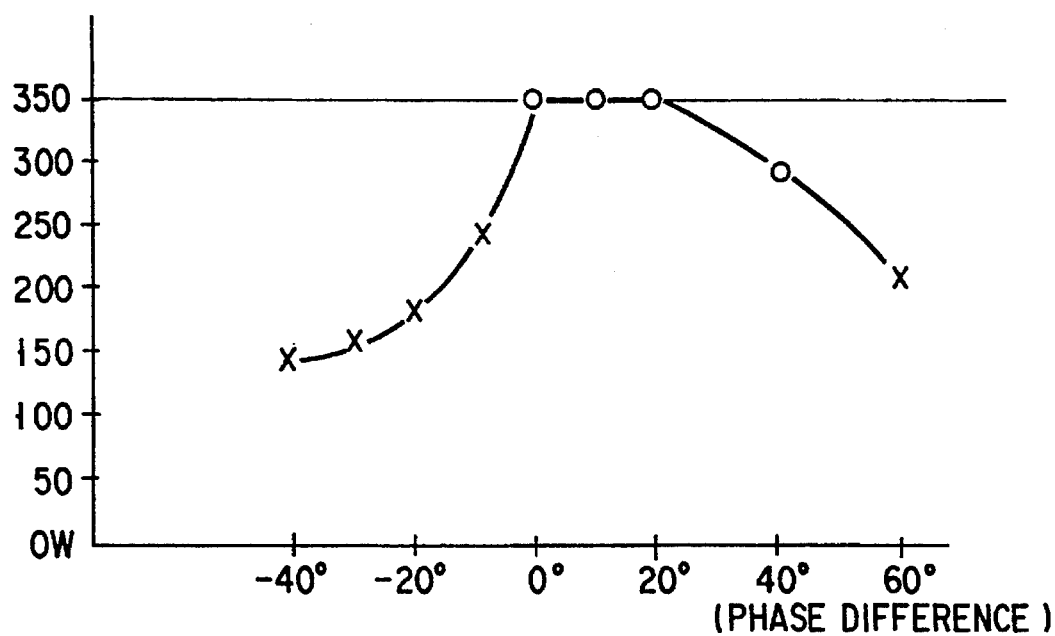
FIG. 4 is a diagram graph showing the results of a device destruction test on an electrodeless discharge lamp lighting apparatus.

FIG. 4 illustrates the results of a device destruction test on the circuit shown in FIG. 3. In FIG. 4, the points marked with white circles indicate that no device destruction occurred even when the power was increased to the static limits of the power source and the device, while the marks "x" indicate points where the device was actually broken.

It is apparent from this diagram that when the phase difference is negative or the phase of the current lags behind that of the voltage, the device is very likely to be broken. While the above results come from the case of using MOSFETs, it is confirmed that similar results are obtained for other devices. It is also confirmed that similar results are obtained by another topologies, e.g., an E class single end-up structure or full bridge structure.

Figure 5:
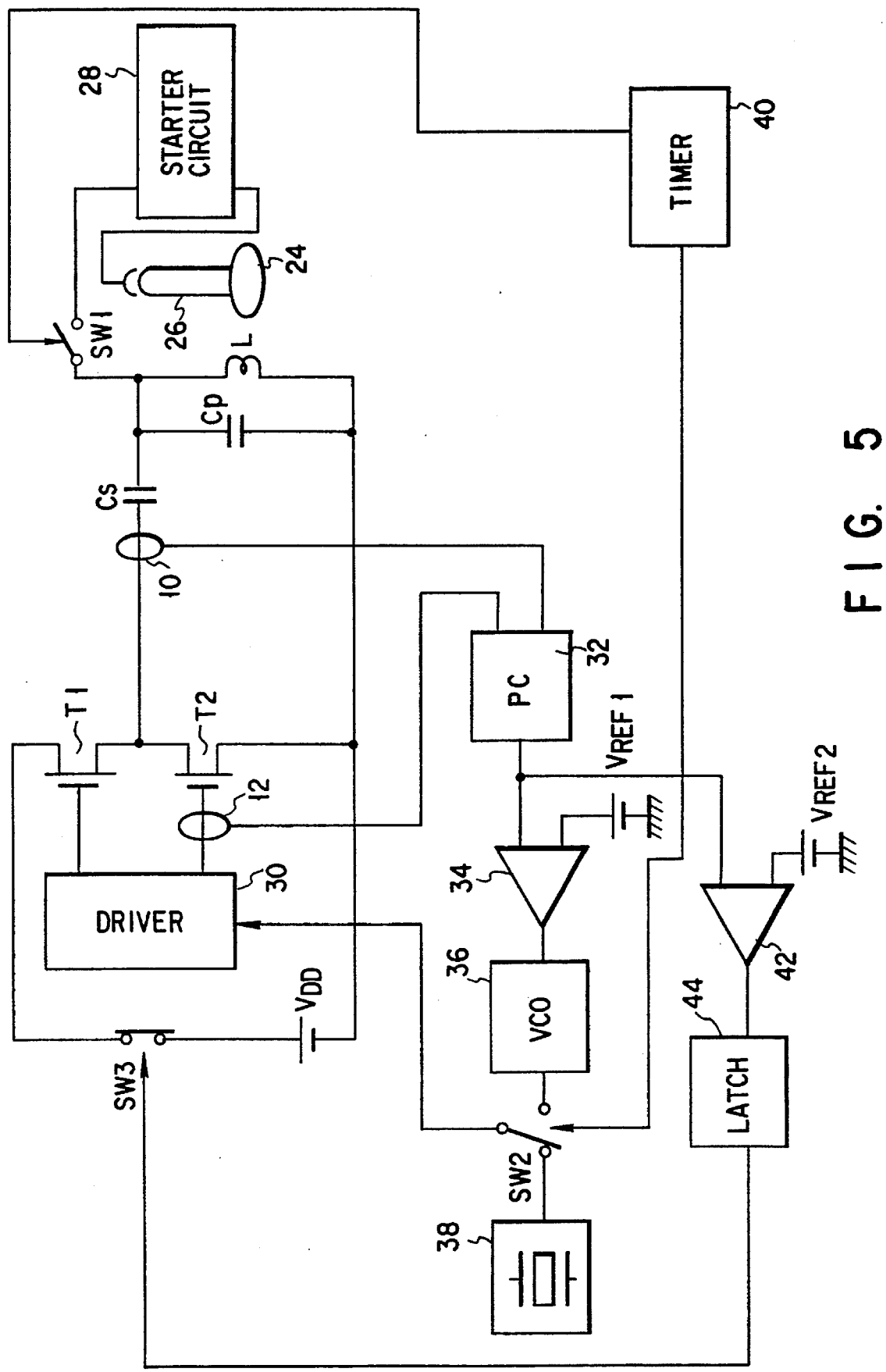
FIG. 5 is a block diagram illustrating the structure of an electrodeless discharge lamp lighting apparatus according to one embodiment of the present invention.

FIG. 5 is a circuit block diagram illustrating the structure of an electrodeless discharge lamp lighting apparatus using an inverter circuit with the above as the premise. The electrodeless discharge lamp lighting apparatus in this diagram uses an electrodeless discharge lamp, which comprises a lamp body 24 of a rod-shape glass tube having krypton gas, NaI or the like sealed in a hollow quartz glass ball and a starting tubing 26 linked to the lamp body 24 to ionize rare gas in the lamp body 24. At the time of starting, a high voltage is applied to the starting tubing 26 to produce glow, and power is supplied to the starter circuit 28 from the exciting coil L to induce glow in the lamp body 24. A switch SW1 is a start switch.

The capacitors Cs and Cp are connected to form a T-shaped circuit, between the power source and the exciting coil L. Those capacitors serve as a matching circuit. The inverter output is supplied through the matching circuit to the exciting coil L from between the node between the switching FETs T1 and T2 and the source of the FET T2. The source voltage $V_{DD}$ is applied between the source of the FET T1 and the drain of the FET T2. Further, a switching high-frequency voltage is applied to the gates of the FETs T1 and T2 from a driver 30.

The above is the basic structure of the known conventional electrodeless discharge lamp lighting apparatus.

In this embodiment, the current pickup section 10 is provided on a line from the node between the FETs T1 and T2 to the capacitor Cs to detect a current associated with the inverter output, and the voltage pickup section 12 is provided on the gate side of the FET T1 to detect a voltage associated with the inverter output. The outputs of the current pickup section 10 and voltage pickup section 12 are sent to a phase comparator (PC) 32, which in turn converts the current and voltage signals into pulse signals (logic signals) to detect the phase difference. A positive or negative pulse corresponding to the phase difference is output from the phase comparator 32 to an error amplifier 34. Reference symbol "$V_{REF}$" indicates a reference voltage.

If there is no phase difference between the voltage and current, the phase comparator 32 produces no output signal. When the phase of the current leads ahead that of the voltage, the phase comparator 32 produces a positive pulse having a pulse width corresponding to the phase difference. When the phase of the current lags behind that of the voltage, on the other hand, the phase comparator 32 produces a negative pulse having a pulse width corresponding to the phase difference. The thus produced pulse is given to a voltage-controlled oscillator 36 from the phase comparator 32.

The voltage-controlled oscillator 36 oscillates at a frequency corresponding to the supplied voltage. The output of this voltage-controlled oscillator 36 is supplied to the driver 30 through one input terminal and a switching terminal of a switch SW2. The other input terminal of the switch SW2 is supplied with the output of a crystal oscillator 38 which oscillates at a fixed frequency. The output signal of the phase comparator 32 is given to the input terminals of the switch SW2. The switches SW1 and SW2 perform an ON/OFF operation based on the output of a timer 40.

The output of phase comparator 32 is also supplied to a latch circuit 44 via an error amplifier 42. The output of this latch circuit 44 is given to a oscillation stopping switch SW3 provided between the source of the FET T1 and the source voltage $V_{DD}$.

The operation of the thus constituted electrodeless discharge lamp lighting apparatus will be described below. At the time of ignition, the switch SW1 is closed to supply resonance energy to the ignition tubing 26 from the starter circuit 28, causing glow discharge. This glow discharge, together with the energy supply to the lamp body 24 from the lighting coil L, induces plasma discharge of the lamp body 24, so that a ring arc discharge is produced in the lamp body 24. As a result, the lamp body 24 reaches the lighting state.

During a period from the beginning point of starting of the electrodeless discharge lamp to the steady state operation of the lamp, the impedance of the electrodeless discharge lamp changes, and this change is picked up as current and voltage by the current pickup section 10 and voltage pickup section 12. As the switch SW2 is set on the voltage-controlled oscillator (36) side during that period, the switching frequency of the inverter circuit is always controlled through a feedback loop (current pickup section 10, voltage-controlled oscillator 12, phase comparator 32, error amplifier 34, voltage-controlled oscillator 36, switch SW2 and driver 30), providing the impedance matching state. The switching timings for the switches SW1 and SW2 are almost simultaneous.

When a predetermined time elapses after the ignition of this lighting apparatus, it is considered that lighting is properly made, the switch SW1 is open by the signal from the timer 40 and the switch SW2 is switches its input terminal to the crystal oscillator (38) side from the voltage-controlled oscillator (36) side. This results in stable switching at the oscillation frequency of the crystal oscillator 38.

The switch SW3 is open when an abnormality occurs, e.g., when arc-extinguishing of the electrodeless discharge lamp occurs or the impedance of the other load is changed. That is, when the phase comparator 32 detects an off phase due to such an abnormality, the power source is set off to protect this lighting apparatus.

Figure 6:
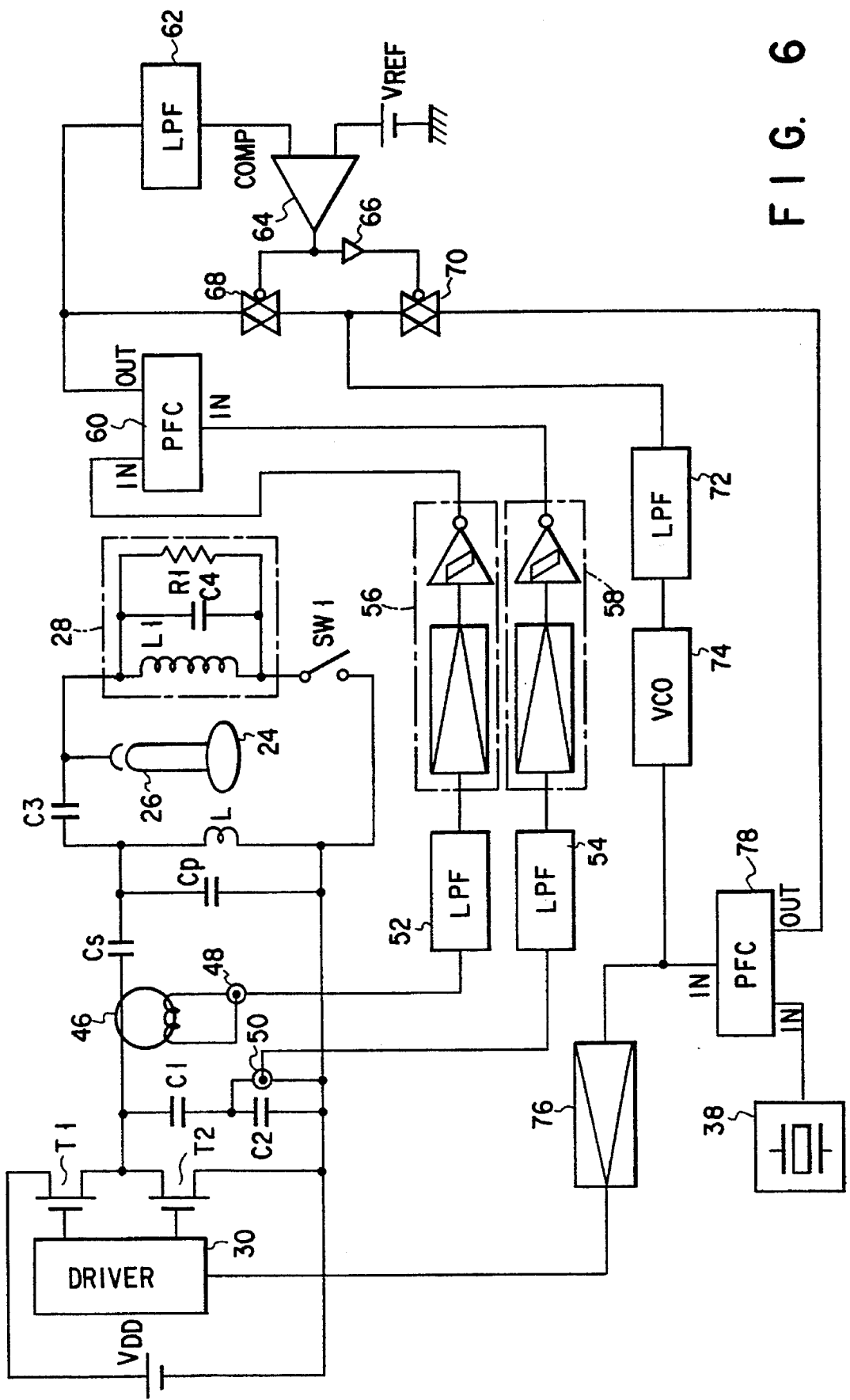
FIG. 6 is a block diagram illustrating the structure of an electrodeless discharge lamp lighting apparatus according to another embodiment of the present invention.

FIG. 6 is a circuit block diagram illustrating another structure of the electrodeless discharge lamp lighting apparatus using an inverter circuit. FIG. 6 uses like or same reference numerals as used for the components of the above-described embodiment to specify corresponding or identical components.

In this electrodeless discharge lamp lighting apparatus, power is supplied via a capacitor C3 to the starter circuit 28 having a coil L1, a capacitor C4 and a resistor R1 connected in parallel in order to apply a high voltage to the activation tubing 26 to produce glow at the time of ignition, thereby inducing arc discharge in the lamp body 24.

In this embodiment, a current transformer 46 is provided on a line from the node between the FETs T1 and T2 to the capacitor Cs to detect a current associated with the inverter output, and a capacitor divider having capacitors C1 and C2 connected in series is provided between the drain and source of the FET T1 to detect a voltage associated with the inverter output. Signals picked up from detection nodes 48 and 50 are respectively supplied to low-pass filters (LPF) 52 and 54 where their harmonics are eliminated.

The outputs of the low-pass filters 52 and 54 are respectively supplied to wave forming circuits 56 and 58 each constituted of an amplifier and a Schmidt circuit. The wave forming circuits 56 and 58 respectively convert the current and voltage signals into pulse signals (logic signals). The pulse signals are sent to a phase frequency comparator (PFC) 60 for detection of the phase difference, and a positive or negative pulse corresponding to the phase difference is output from the phase frequency comparator 60.

If there is no phase difference between the voltage and current, the phase frequency comparator 60 produces no output signal. When the phase of the current leads ahead that of the voltage, the phase frequency comparator 60 produces a positive pulse having a pulse width corresponding to the phase difference. When the phase of the current lags behind that of the voltage, on the other hand, the phase frequency comparator 60 produces a negative pulse having a pulse width corresponding to the phase difference. The thus produced pulse is supplied to a low-pass filter 62 and the input terminal of an analog switch 68.

The low-pass filter 62 constitutes a switching controller together with a comparator 64. This filter 62 integrates the given pulse to convert it into a DC voltage and supplies the voltage to one input terminal of the comparator 64. A reference voltage $V_{REF}$ is given to the other input terminal of the comparator 64. The reference voltage $V_{REF}$ is the output signal of the phase frequency comparator 60 converted to a DC level by the low-pass filter 62 when the electrodeless discharge lamp lighting apparatus operates properly. For instance, $V_{REF}$ is a value when the phase of the current lags behind that of the voltage by 10 to 30%.

The output of the comparator 64 is supplied to the control terminal of the analog switch 68 directly and to the control terminal of an analog switch 70 via an inverter 66. Accordingly, one of the analog switches 68 and 70 is selectively open. The selected signal is supplied to a low-pass filter 72 from the node between the output terminals of the analog switches 68 and 70. This low-pass filter 72 performs integration to prepare a DC voltage. This DC voltage is supplied as a control voltage to a voltage-controlled oscillator 74. The voltage-controlled oscillator 74 oscillates at a frequency corresponding to the supplied voltage. The output of the voltage-controlled oscillator 74 is given to an amplifier 76 and a phase frequency comparator 78.

The phase frequency comparator 78 is supplied with the output of the voltage-controlled oscillator 74 and the output of the crystal oscillator 38 which oscillates at a fixed frequency. The phase frequency comparator 78 has the same structure as the phase frequency comparator 60.

The output signal of the phase frequency comparator 78 is supplied to the input terminal of the analog switch 70. With the analog switch 68 open, therefore, the output of the phase frequency comparator 78 is stopped by the analog switch 70 and will not be involved in the operation of the lighting apparatus. With the analog switch 70 close, on the other hand, the phase frequency comparator 78, low-pass filter 72, voltage-controlled oscillator 74 and crystal oscillator 38 constitute a PLL (Phase-Locked Loop) circuit so that the output of the voltage-controlled oscillator 74 becomes the oscillation frequency of the crystal oscillator 38.

The output of the voltage-controlled oscillator 74 is sent to the driver 30 after being amplified by the amplifier 76.

The operation of the thus constituted electrodeless discharge lamp lighting apparatus will be described below.

When the switch SW1 is closed, power is supplied via the capacitor C3 to a resonance circuit (28) consisting of the capacitor C4, coil L1 and resistor R1, causing resonance. The resonance energy is supplied to the activation tubing 26, causing glow discharge. This glow discharge, together with the energy supply to the lamp body 24 from the lighting coil L, induces discharge of the lamp body 24, so that a ring arc discharge is produced in the lamp body 24. As a result, the lamp body 24 reaches the lighting state.

During a period from the point of activation of the electrodeless discharge lamp to the lighting of the lamp, the impedance response of the electrodeless discharge lamp changes, and this change is picked up as current and voltage by the current transformer 46 and the divider consisting of capacitors C1 and C2. The switching frequency of the inverter circuit is controlled through the feedback loop, providing the impedance matching state.

The current and voltage picked up by the current transformer 46 and the divider consisting of capacitors C1 and C2 are put through the low-pass filters 52 and 54 to eliminate the harmonics, and then converted into pulse signals by the wave forming circuits 56 and 58. The wave forming circuits 56 and 58 have the same structure.

The operation circuit includes a parasitic capacitance, parasitic inductance or the like, which becomes a large load to the inverter circuit. This superposes a large ringing on the waveforms of the voltage and current indicated in FIG. 8A to the load side due to a frequency change at the time of activation. But, the wave forming circuits 56 and 58 indicated in FIG. 7 can provide pulse signals with a duty ratio of about 50% by which the phase information of the current and voltage can be grasped accurately.

Figure 7:
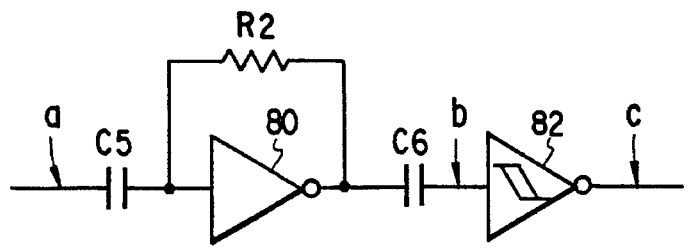
FIG. 7 is a structural diagram showing one example of a wave forming circuit used in the electrodeless discharge lamp lighting apparatus shown in FIG. 6.

The wave forming circuits 54 and 56 are constituted as shown in FIG. 7. The picked signals corresponding to the current and voltage are supplied to the inverter 80 via a capacitor C5 for elimination of the DC components. A feedback resistor R2 is connected between input and output terminals of the inverter 80 so that the input/output voltage of the inverter 80 becomes ½ of the source voltage $V_{DD}$ or becomes saturated. The output of the inverter 80 is supplied via a coupling capacitor C6 to a Schmidt circuit 82 where its waveform is further shaped.

Figure 8A:
FIGS. 8A through 8C show signals waveforms at individual sections of the wave forming circuit in FIG. 7.
Figure 8B:
Figure 8C:

The signal waveforms at individual sections a, b and c in FIG. 7 are illustrated in FIGS. 8A, 8B and 8C, respectively. As apparent from those waveforms, the DC component of the input signal is eliminated by the capacitor C5, the resultant signal is converted into a pulse signal, and a wave-shaped pulse is finally obtained from the Schmidt circuit 82. As another example of the wave forming circuit, two inverters each with a feedback resistor may be cascade-connected. This structure can increase the amplification factor.

A description will now be given of the structures of the low-pass filters 52 and 54 at the preceding stage of the wave forming circuits 56 and 58 in the embodiment shown in FIG. 6.

Figure 9A:
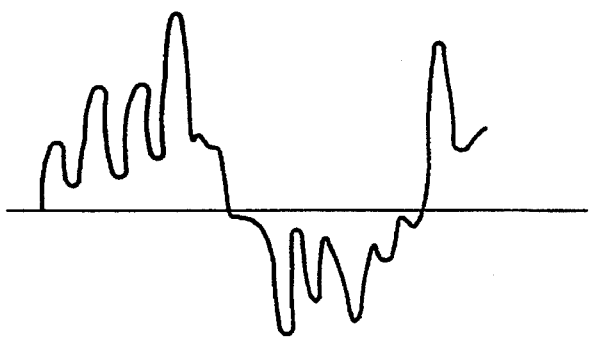
FIGS. 9A and 9B show waveforms at the time a pulse signal is formed without a low-pass filter.
Figure 9B:

At the time the electrodeless discharge lamp is activated, the load of the inverter circuit mostly consists of a reactance component. Therefore, a floating inductance, such as stray inductance or lead inductance, resonates with the capacitance of the matching circuit so that the voltage and current to the load side contain many ringings. If the voltage and current containing many ringings are picked up, it is impossible to detect the phase components directly therefrom. For instance, if the signal shown in FIG. 9A is picked up from the detection nodes 48 and 50, five pulses would be produced according to the ringings by simple use of the saturation amplifiers (FIG. 9B).

To avoid this problem, a bandpass filter or low-pass filter is used. If a circuit constituted of a reactance component, such as a Butterworth circuit or Chebyshef circuit, is used, the phase difference will not become zero and a signal having a phase error will be picked up due to a change in switching frequency or a variation in devices.

Figure 10:
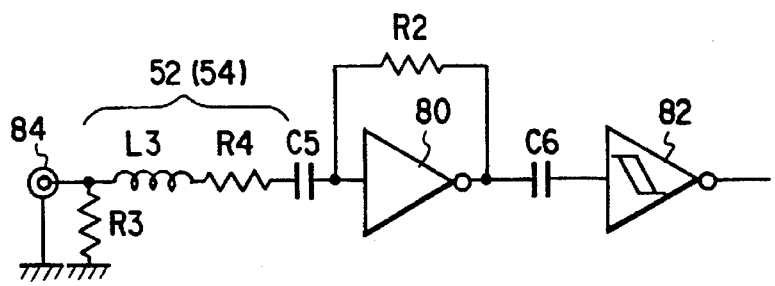
FIG. 10 is a structural diagram showing one example of a low-pass filter used in the electrodeless discharge lamp lighting apparatus shown in FIG. 6.

In this embodiment, the low-pass filter 52 (54) constituted of a resistance component is used. For instance, a magnetic material has such a property that the loss coefficient of a magnetic material if selected properly increases with the frequency. Using this property, the low-pass filter is designed to lose the high-frequency component by the magnetic material. More specifically, the low-pass filter in use is a device whose equivalent circuit is expressed by a series circuit of an inductance L3 and a resistor R4 and which is coupled to an end 84 of a coaxial cable as the detection node, for example, a ferrite-used toroidal coil (e.g., seven turns of Amidon FT-37-43n whose loss coefficient drastically increases from the vicinity of 10 MHz), as shown in FIG. 10. With the use of the low-pass filter 52 (54) having the above structure, the area where the loss coefficient of the magnetic material increases together with the frequency becomes the area of the fifth order harmonics from the area of the fundamental waveform, so that the harmonics in this range can properly be eliminated. In other words, the signal, picked up by the low-pass filter 52 (54) in cooperation with the wave forming circuit 56 (58) located at the subsequent stage, does not have a phase difference with respect to the original signal and a pulse suitable for phase comparison can be obtained.

Let us consider the case where the phase of the current leads ahead that of the voltage. In this case, a positive pulse corresponding to the phase difference will be produced. Assume that the output of the low-pass filter 62 acquired from this positive pulse is greater than the reference voltage $V_{REF}$ to close the analog switch 68. Then, the control voltage integrated by the low-pass filter 72 changes in the direction to increase the oscillation frequency of the voltage-controlled oscillator 74. As the phase difference becomes larger, the pulse width of the positive pulse becomes wider so that the control voltage changes in the direction to further increase the oscillation frequency of the voltage-controlled oscillator 74. The rise of the oscillation frequency acts to lag the phase of the current behind that of the voltage.

When the phase of the current lags behind that of the voltage, a negative pulse will be produced from the phase frequency comparator 60, and the control voltage integrated by the low-pass filter 72 changes in the direction to decrease the oscillation frequency of the voltage-controlled oscillator 74. As the phase difference becomes larger, the pulse width of the negative pulse becomes wider so that the control voltage changes in the direction to further decrease the oscillation frequency of the voltage-controlled oscillator 74. The falling of the oscillation frequency acts to lead the phase of the current ahead that of the voltage. Although there is one comparator 64 and there is no consideration given to opening the analog switch 68 when the phase of the current lags behind that of the voltage in FIG. 6, a separate comparator and a separate reference value are used in another embodiment so that the analog switch 68 is close when the phase of the current lags behind that of the voltage.

When the ignition is complete and the lighting of the lamp or the like is properly carried out, the phase difference between the voltage and current falls within a predetermined range and the analog switch 70 is close, allowing switching at the oscillation frequency of the crystal oscillator 38.

The phase frequency comparator 60 produces no output when the voltage and current are in phase in the above embodiment. Since it is preferable that the phase of the current lags behind that of the voltage to some degree as mentioned in the foregoing description with reference to FIG. 4, a delay circuit is provided in a voltage or current detection passage in another embodiment, so that the voltage and the current having a phase lagging behind that of the voltage are given to the phase frequency comparator 60 and this comparator 60 produces no output when the phase of the current lags by 20 degrees. With this design, it is apparent from FIG. 4 that an output for the negative side will not be made with the optimal phase relation, so that the switching between the analog switches 68 and 70 can be made at this time to close the analog switch 70. In this case, of course, when the phase of the current lags too much, the analog switch 68 is close again.

Figure 11:
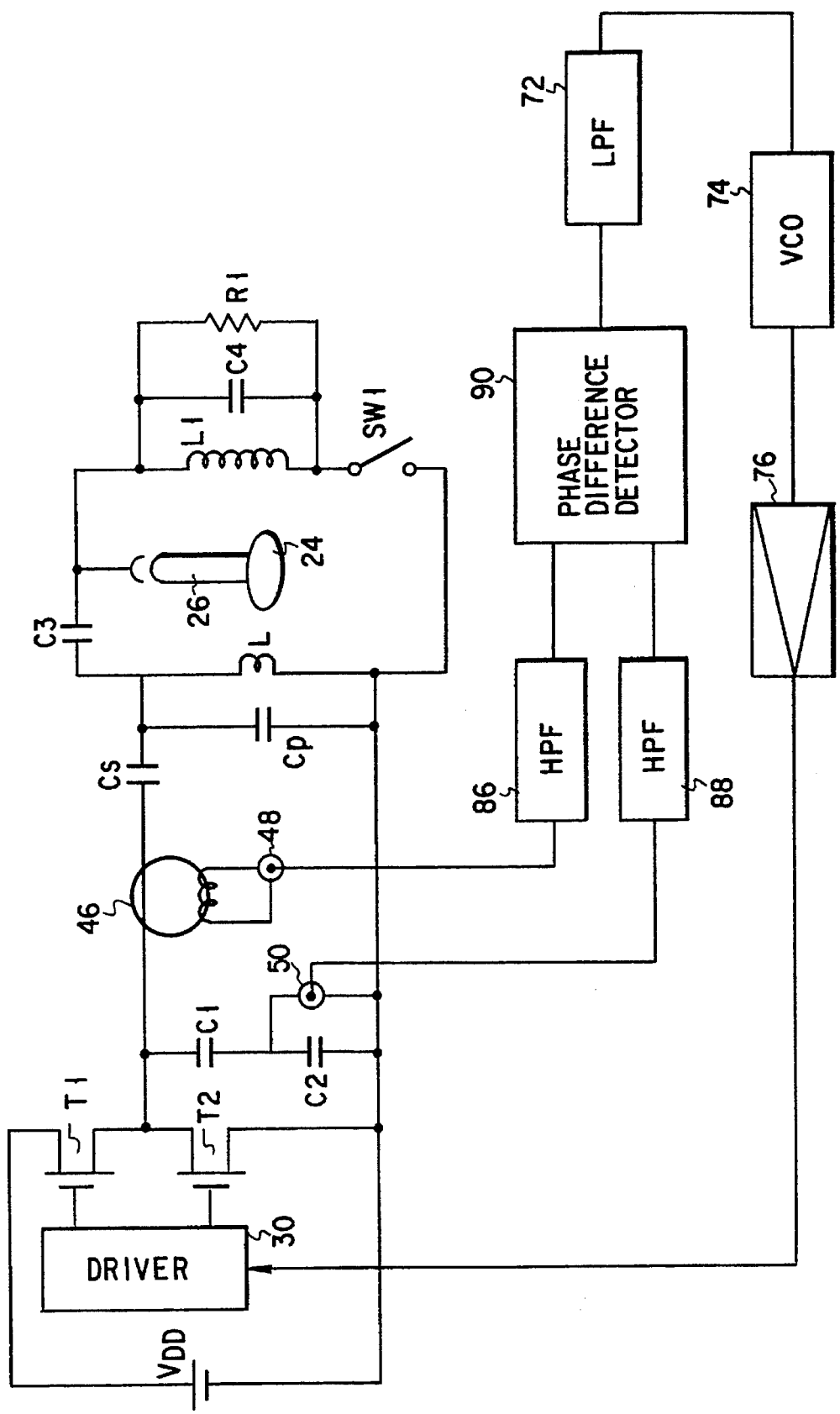
FIG. 11 is a block diagram illustrating the structure of an electrodeless discharge lamp lighting apparatus according to a different embodiment of the present invention.

FIG. 11 presents a block diagram illustrating an electrodeless discharge lamp lighting apparatus having the inverter circuit shown in FIG. 2 according to another embodiment. FIG. 11 uses like or same reference numerals as used for the components of FIG. 6 specify corresponding or identical components to thereby avoid their redundant description.

The feature of this embodiment lies in that the signals picked up from the detection nodes 46 and 48 are led to high-pass fileters 86 and 88 and are allowed to reach a phase difference detector 90 only when there is a transient change in the current and voltage. When receiving no signals from the high-pass fileters 86 and 88, the phase difference detector 90 outputs a pulse of the same frequency as that of the output of the crystal oscillator 38 shown in FIG. 6. This pulse is integrated by the low-pass filter 72 to be a control voltage that causes the voltage-controlled oscillator 74 to oscillate at the corresponding frequency. The output of the voltage-controlled oscillator 74 is amplified by the amplifier 76 and is then supplied to the driver 30 to be used as a switching signal.

When the current and voltage transitionally change and the resultant signals are given to the phase difference detector 90, the phase difference detector 90 outputs a pulse corresponding to a positive or negative phase based on the phase relation between the two signals.

When the phase of the current leads ahead that of the voltage, a positive pulse corresponding to the phase difference is output. This pulse is integrated by the low-pass filter 72 to be a control voltage. This control voltage changes in the direction to increase the oscillation frequency of the voltage-controlled oscillator 74. As the phase difference becomes larger, the pulse width of the positive pulse becomes wider so that the control voltage changes in the direction to further increase the oscillation frequency of the voltage-controlled oscillator 74. The rise of the oscillation frequency acts to lag the phase of the current behind that of the voltage.

When the phase of the current lags behind that of the voltage, on the other hand, a negative pulse will be produced from the phase difference detector 90, and the control voltage integrated by the low-pass filter 72 changes in the direction to decrease the oscillation frequency of the voltage-controlled oscillator 74. As the phase difference becomes larger, the pulse width of the negative pulse becomes wider so that the control voltage changes in the direction to further decrease the oscillation frequency of the voltage-controlled oscillator 74. The falling of the oscillation frequency acts to lead the phase of the current ahead that of the voltage.

Figure 12:
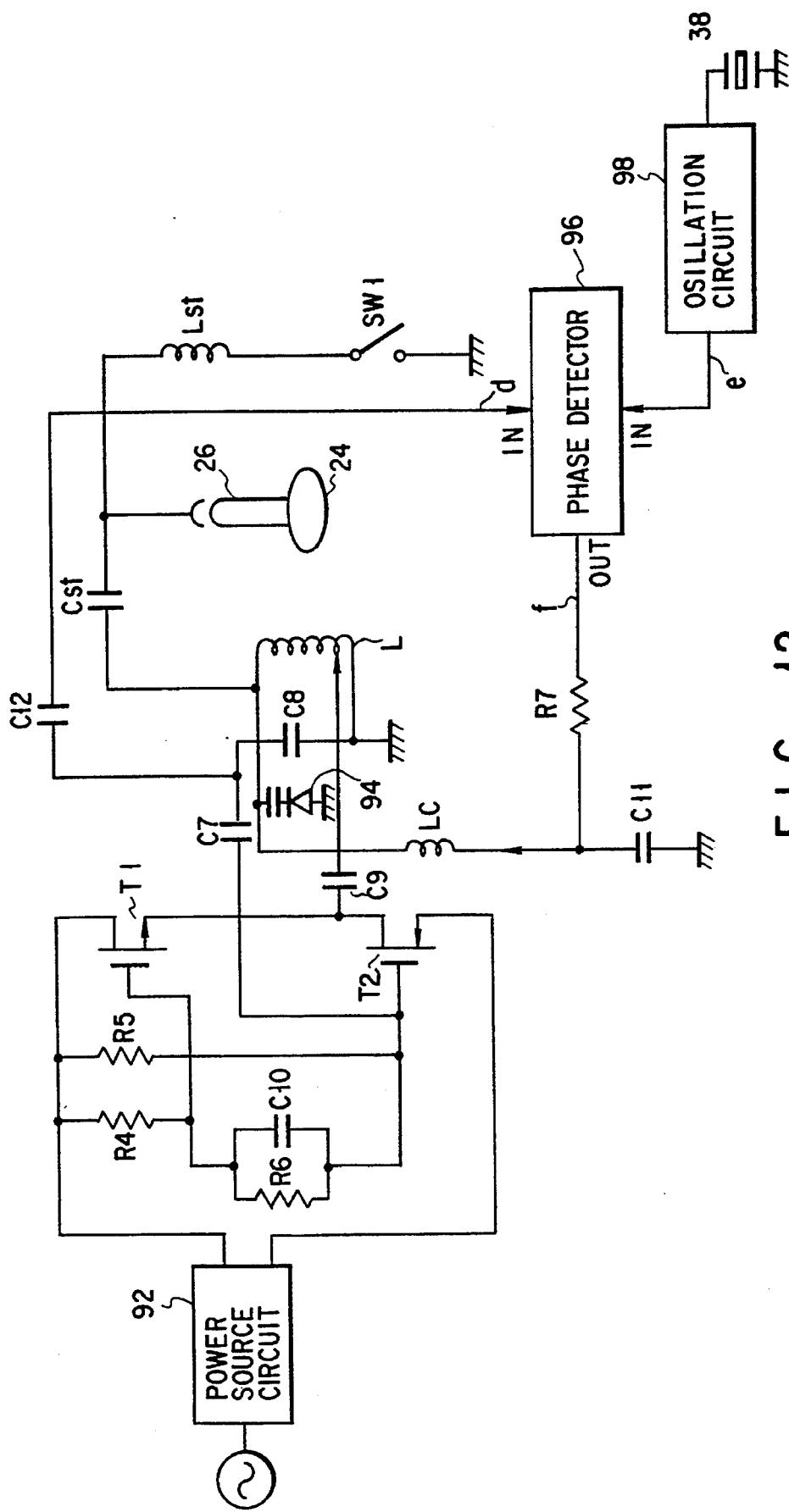
FIG. 12 is a block diagram illustrating the structure of an electrodeless discharge lamp lighting apparatus according to a further embodiment of the present invention.

FIG. 12 is a block diagram illustrating an electrodeless discharge lamp lighting apparatus according to a further embodiment of this invention.

A power source circuit 92 supplies oscillation power to a self-oscillation circuit, which comprises complementary-connected FETs T1 and T2, capacitor C and exciting coil L. Connected to the gate of the FET T2 is a series circuit of a capacitor C7 for determining the feedback amount and a capacitor C8 which constitutes a tank circuit. Connected in parallel to this capacitor C8 is the exciting coil L, which constitutes the Hartley self-oscillation circuit and supplies electromagnetic energy to the lamp body 24 of the electrodeless discharge lamp. Reference symbol "C9" denotes a coupling capacitor.

A phase compensation resistor R6 and a phase compensation capacitor C10 constitute an oscillation frequency compensation circuit for the Hartley self-oscillation circuit. This oscillation frequency compensation circuit is connected via bias resistors R4 and R5 to the gates of the FETs T1 and T2. The FETs T1 and T2 are connected in complementary manner as mentioned above, and constitute the Hartley self-oscillation circuit together with the capacitor C and exciting coil L.

A high-frequency choke coil LC for inhibiting a high-frequency current from flowing into the output side of the Hartley self-oscillation circuit, and a capacitor C11 are connected to the exciting coil L via a voltage-controlled variable capacitance diode 94. This diode 94 changes its capacitance in accordance with a separately applied voltage. The capacitor C11 constitutes an integration circuit together with a resistor R7. Further connected to the exciting coil L is a switch SW1 which sets on or off a high voltage generator, which is constituted of a capacitor Cst and a coil Lst.

A phase detector 96 detects the phase difference between the oscillation frequency of a high-frequency current d, acquired via an oscillation input capacitor C12 of the Hartley self-oscillation circuit, and the phase of a reference signal e input from an oscillation circuit 98, and generates a phase detection signal f having a pulse width corresponding to this phase difference. The crystal oscillator 38 serves to determine the oscillation frequency of the oscillation circuit 98 (13.56 MHz).

The operation of this embodiment will now be described. At the time of ignition, the switch SW1 is set on to enable the high voltage generator, constituted of the capacitor Cst and coil Lst, allowing the power from the power source circuit 92 to be supplied to the FETs T1 and T2. Consequently, the Hartley self-oscillation circuit, which comprises the complementary-connected FETs T1 and T2, capacitor C and exciting coil L, starts oscillating at 13.56 MHz. Since the high-frequency current produced by this oscillation flows into the high voltage generator at the beginning, the high voltage generated by this voltage generator is applied via the electrode to the activation tubing 26. As a result, glow discharge occurs in the tubing 26 and it enters the lamp body 24, ionizing the rare gas.

When the rare gas in the lamp body 24 is ionized, a ring-shaped discharge passage is formed in the lamp body 24 by the magnetic field created by the high-frequency current flowing across the exciting coil L. The ring discharge passage is magnetically coupled to the exciting coil L, so that the electromagnetic energy produced by the high-frequency current flowing across the exciting coil L starts being fed into the lamp body 24 via the ring discharge passage.

Thereafter, the switch SW1 is set off to stop the operation of the high voltage generator. The capacitor Cst and coil Lst also serve as part of the tank circuit to determine the oscillation frequency of the Hartley self-oscillation circuit thereafter. When the high-frequency current flowing across the exciting coil further increases under this circumstance, the ring discharge passage formed in the lamp body 24 is transformed into a grow arc, thus lighting the electrodeless discharge lamp.

When the Hartley self-oscillation circuit starts oscillating, its oscillation output current d is input via the capacitor C12 to the phase detector 96. As the reference signal e is input to the phase detector 96 from the oscillation circuit 93 that accurately oscillates at 13.56 MHz, the oscillation frequency of the crystal oscillator 38, the phase of the oscillation output current d is compared with that of the reference signal e in the phase detector 96. A phase detection signal f having a pulse width corresponding to the phase difference is sent out to the integration circuit constituted of the resistor R7 and capacitor C11.

This integration circuit integrates the input phase detection signal f to convert it to a voltage corresponding to the mentioned pulse width, and applies this voltage to the voltage-controlled variable capacitance diode 94. This diode 94 changes its capacitance in accordance with the applied voltage to control the resonance frequency of the Hartley self-oscillation circuit to be constant so that the phase difference detected by the phase detector 96 becomes zero. Accordingly, the oscillation frequency of the Hartley self-oscillation circuit is always controlled to be 13.56 MHz.

As the impedance of the electrodeless discharge lamp varies with time during the period from the beginning of the activation to the point of stable lighting, the impedance of the load circuit constituted of this electrodeless discharge lamp and the exciting coil L is also time-dependent, as mentioned earlier. As described earlier, however, the voltage-controlled variable capacitance diode 94 inserted in parallel to the exciting coil L changes its capacitance through the aforementioned feedback system to cancel out the change in the impedance of the load circuit. Thus, control is performed to always match the impedance of the load circuit with that of the tank circuit of the Hartley self-oscillation circuit irrespective of a change in the impedance of the load circuit. During the lighting period of the electrodeless discharge lamp including the beginning of the activation, therefore, a high-frequency current always in the proper range is supplied to the exciting coil L from the Hartley self-oscillation circuit regardless of the change in load impedance, and the oscillation frequency is kept at a constant frequency of 13.56 MHz.

When the lamp body 24 is lit at the start of the lighting action, an arc ring is produced in the lamp as mentioned earlier. As this arc ring acts to cancel out the self inductance of the exciting coil L, it will increase the oscillation frequency of the Hartley self-oscillation circuit. In this case, however, as the capacitance of the voltage-controlled variable capacitance diode 94 changes to suppress the rise of the oscillation frequency, control not to lower the oscillation frequency will be performed. It is desirable that the increase of the oscillation frequency is suppressed as much as possible. Thus, a change in impedance made between before and after the activation of the electrodeless discharge lamp can be suppressed by setting the total impedance of the resonance circuit of the capacitor Cst and coil Lst to the induction side in advance so that the resonance frequency of the Hartley self-oscillation circuit decreases when the switch SW1 is open immediately before the occurrence of the arc ring.

With the above structure, even when an arc ring is produced, the oscillation frequency of the Hartley self-oscillation circuit does not decrease much. It is possible to reduce the burden of the voltage-controlled variable capacitance diode 94 to adjust the impedance accordingly.

According to this embodiment, the capacitance of the voltage-controlled variable capacitance diode 94 is changed in such a way that the difference between the phase of the oscillation signal d of the Hartley self-oscillation circuit and the phase of the reference signal e of 13.56 MHz becomes zero, allowing the oscillation frequency of the Hartley free-running oscillator to be always 13.56 MHz. Even if the impedance of the load circuit including the electrodeless discharge lamp changes with time as occurring at the time of the activation of this lamp, the impedance on the high-frequency current output side can always be matched with that of the load circuit. It is therefore possible to prevent mismatching of the impedance of the tank circuit of the Hartley self-oscillation circuit with the impedance of the load circuit and to set the high-frequency current flowing across the exciting coil L to be always in the proper range, thus always ensuring stable lighting of the electrodeless discharge lamp.

The present invention is not limited to a Hartley type self-oscillation circuit, but may be adapted for any type of free-running oscillator which has a voltage-controlled variable capacitance element connected in parallel or in series to the resonance capacitor. This invention may also be applied to an inverter having a separately excited oscillator.

This invention is also effective in tracking the impedance change caused by the adjustment of the lamp light. The light adjustment may be executed by changing the output voltage of the power source circuit 92 shown in FIG. 12.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A lamp operating apparatus for an electrodeless discharge lamp which assumes at least two statuses during operation, comprising:

supplying means for supplying high frequency electromagnetic power having at least two different frequencies to said electrodeless discharge lamp, said supplying means comprising an operating circuit having a first oscillator which generates first high frequency electric power and a second oscillator which generates second high frequency electric power, said first and second high frequency electric power corresponding to said electromagnetic power having at least two different frequencies; and changing means for changing frequencies of said high frequency electromagnetic power supplied to said electrodeless discharge lamp in accordance with said at least two statuses of said electrodeless discharge lamp.

2. A lamp operating apparatus for an electrodeless discharge lamp according to claim 1, wherein said operating circuit further comprises a variable oscillator which generates high frequency electric power which is variable in frequency between a first high frequency electric power and a second high frequency electric power a frequency of which is different from that of said first high frequency electric power.

3. A lamp operating apparatus for an electrodeless discharge lamp according to claim 1, wherein said changing means further comprises detecting means for detecting a status of said electrodeless discharge lamp and generating a status signal corresponding to said status of said electrodeless discharge lamp, said changing means changing a frequency of said high frequency electromagnetic power in accordance with said status signal.

4. A lamp operating apparatus for an electrodeless discharge lamp according to claim 1, wherein said changing means selects said at least two different frequencies in accordance with a first status of said electrodeless discharge lamp during its ignition and a second status of said electrodeless discharge lamp after its ignition.

5. A lamp operating apparatus for an electrodeless discharge lamp which assumes at least two statuses during operation, comprising:

supplying means for supplying high frequency electromagnetic power having at least two different frequencies to said electrodeless discharge lamp; and changing means for changing frequencies of said high frequency electromagnetic power supplied to said electrodeless discharge lamp in accordance with said at least two statuses of said electrodeless discharge lamp, wherein said changing means comprises timing means for counting a time period from ignition of said electrodeless discharge lamp until a stable status of said electrodeless discharge lamp is assumed and generating a status signal corresponding to said status of said electrodeless discharge lamp, said changing means changing a frequency of said high frequency electromagnetic power in accordance with said status signal.

6. An inverter circuit comprising:

first oscillation means which oscillates at a fixed frequency;

load-status detecting means for receiving a voltage and a current applied to a load including an inductive or capacitive component to detect a load status of said load;

second oscillation means which oscillates at a frequency corresponding to said load status detected by said load-status detecting means; and frequency changing means for selecting one of an output of said first oscillation means and an output of said second oscillation means to change a frequency in accordance with said load status.

7. An inverter circuit according to claim 6, further comprising control means for controlling a change by said frequency changing means in accordance with a load status of said load.

8. An inverter circuit according to claim 6, further comprising transient change detecting means for detecting said voltage and current to be applied to said load when a transient change occurs in said voltage and current, whereby said load-status detecting means obtains said voltage and current detected by said transient change detecting means to detect a status of said load.

9. An inverter circuit according to claim 6, wherein said load-status detecting means detects a phase difference between said voltage and current to thereby detect said load status.

10. An electrodeless discharge lamp lighting apparatus comprising:

an electrodeless discharge lamp;

load-status detecting means for detecting a load status of said electrodeless discharge lamp;

first oscillation means which oscillates at a fixed frequency;

second oscillation means which oscillates at a frequency corresponding to said load status of said electrodeless discharge lamp detected by said load-status detecting means;

frequency changing means for selecting one of an output of said first oscillation means and an output of said second oscillation means to change a frequency in accordance with said load status of said electrodeless discharge lamp; and control means for controlling a frequency change caused by said frequency changing means in accordance with said load status of said electrodeless discharge lamp.

11. An electrodeless discharge lamp lighting apparatus according to claim 10, wherein said load-status detecting means receives a voltage and a current to be applied to said electrodeless discharge lamp and detects said load status based on said voltage and current.

12. The electrodeless discharge lamp lighting apparatus according to claim 10, wherein said load-status detecting means outputs a phase difference signal corresponding to a phase difference between an acquired voltage and current, and said control means controls frequency switching based on said phase difference signal.

13. An electrodeless discharge lamp lighting apparatus according to claim 11, wherein said load-status detecting means outputs a phase difference signal corresponding to a phase difference between an acquired voltage and current, and said control means controls frequency switching based on said phase difference signal.

14. An electrodeless discharge lamp lighting apparatus according to claim 10, further comprising transient change detecting means for detecting a voltage and a current to be applied to said load when a transient change occurs in said voltage and current, whereby said load-status detecting means obtains said voltage and current detected by said transient change detecting means to detect a status of said load.

15. An electrodeless discharge lamp lighting apparatus according to claim 14, wherein said transient change detecting means comprises a high-pass filter.

16. An electrodeless discharge lamp unit, comprising:

an electrodeless discharge lamp having an envelope and a filling gas which fills said envelope, and which assumes at least two statuses during operation;

supplying means for supplying high frequency electromagnetic power having at least two different frequencies to said electrodeless discharge lamp, said supplying means comprising an operating circuit having a first oscillator which generates first high frequency electric power and a second oscillator which generates second high frequency electric power, said first and second high frequency electric power corresponding to said electromagnetic power having at least two different frequencies; and changing means for changing a frequency of said high frequency electromagnetic power supplied to said electrodeless discharge lamp corresponding to said at least two statuses of said electrodeless discharge lamp.

17. An electrodeless discharge lamp unit according to claim 16, wherein said operating circuit further comprises a variable oscillator which generates high frequency electric power which is variable in frequency between a first high frequency electric power and a second high frequency electric power a frequency of which is different from that of said first high frequency electric power.

18. An electrodeless discharge lamp unit according to claim 16, wherein said changing means further comprises detecting means for detecting a status of said electrodeless discharge lamp and generating a status signal corresponding to said status of said electrodeless discharge lamp, said changing means changing a frequency of said high frequency electromagnetic power according to said status signal.

19. An electrodeless discharge lamp unit according to claim 16, wherein said changing means further comprises timing means for counting a period from ignition of said electrodeless discharge lamp until a stable status of said electrodeless discharge lamp is assumed and generating a status signal corresponding to a status of said electrodeless discharge lamp, said changing means changing a frequency of said high frequency electromagnetic power according to said status signal.

20. An electrodeless discharge lamp unit according to claim 16, wherein said changing means selects said two different frequencies in accordance with a first status of said electrodeless discharge lamp during its ignition and a second status of said electrodeless discharge lamp after its ignition.

* * * * *